United States Patent Office 3,493,836
Patented Feb. 3, 1970

3,493,836
STATIC AND DYNAMIC FAILURE MONITOR FOR AIRCRAFT AUTOMATIC PILOTS
Raymond A. Nelson, Phoenix, Ariz., assignor to Sperry Rand Corporation, a corporation of Delaware
Filed Mar. 30, 1967, Ser. No. 627,001
Int. Cl. B64c 13/18
U.S. Cl. 318—489      4 Claims

ABSTRACT OF THE DISCLOSURE

A failure monitor wherein system commands and responses are compared by dynamic or wash-out comparison and by static or direct cancellation comparison. During normal operation compared signals will cancel, but automatic pilot disengagement will occur if there is a mismatch of the dynamically compared signals that exceeds a threshold for a first predetermined time period (300 milliseconds) or a mismatch of the statically compared signals that exceeds a threshold for a second predetermined time period (600 milliseconds). Generally, the dynamically compared signals are those from the auto pilot motion sensors, such as gyros; while the statically compared signals are those from the autopilot servo systems. The validity of the comparisons is assured by utilizing independent signal sources or circuits within the monitor for generating signals equivalent to those derived within the autopilot.

Background of the invention

The present invention relates to monitoring apparatus for aircraft automatic pilots whereby any component or sub-system failures therein will be immediately and positively detected and the auto pilot disengaged from the control of the craft before a dangerous attitude or flight condition can result.

While the failure monitor of the present invention may be employed for detecting failures during all phases of an automatically controlled flight, it is particularly applicable to those last phases of the flight prior to touchdown, i.e. during the approach and flare-out maneuvers. For completely automatic landings, it is essential that the operation of the automatic control system be continuously monitored either by completely redundant control channels or by fail safe monitors such that if a failure should occur at a critical point during the landing maneuver, the automatic control is disengaged allowing the human pilot to take over and complete the landing manually or institute a go-around maneuver. In a specific application, the invention is incorporated to monitor a single roll axis channel of the automatic pilot only during the final approach and flare phases of flight while the pitch axis is controlled by dual pitch channels. The monitor of the present invention continuously surveys the operation of the roll channel sensors, signal shaping or maneuver command computers or servos and actuator servos thereby eliminating the necessity of dual roll channels.

Autopilot failure monitors have been proposed and used for several years for monitoring normal cruise modes of operation of autopilots and in some cases, the initial approach modes. U.S. Patents to Hess 2,823,877; Miller et al. 2,973,927; and Close et al. 3,252,675, all assigned to the same assignee as the present invention, are typical. However, during final automatic approach and landing flare modes, precision monitoring is mandatory so that malfunctions are substantially immediately detected and acted upon. Not only must all automatic stabilization sensors and surface actuators be monitored but also all autopilot path control signals and command signal generators. The noted patents have drawbacks which prevent their use in these critical flight modes and which are overcome by the present invention. For example, the Hess patent, while it discloses command compensation, i.e. preventing monitor disconnect during normal commanded maneuvers, it cannot distinguish between a wanted command and a command due to a failure; while the Close et al. patent overcomes this problem, it does so by removing the command compensation after the aircraft motion commanded has stabilized. The Miller et al. patent, like both Hess and Close et al. require carefully calibrated shaping networks for affecting the desired signal matching and preventing signal noise and very high frequency transients from causing nuisance cut outs.

The present invention overcomes these shortcomings of the known prior art by separately monitoring the dynamic or normally high frequency signals operating within the autopilot. The dynamic monitor continuously monitors the autopilot sensors, such as displacement and rate gyros, while the static monitor continuously monitors the surface actuators and other servo loops operating within the autopilot. The dynamic monitor receives automatic pilot sensor signals and duplicate or redundant sensor signals and compares only the dynamic or rapidly changing components thereof, i.e. wash-out comparison, while the static monitor receives functionally equivalent servo input and output signals and compares them by direct signal cancellation. In order to prevent nuisance disengagements of the autopilot due to very high frequency signals, such as noise or other transients, in either monitor and in order to eliminate carefully calibrated filter networks, any mismatch between the dynamically compared signals is merely applied to a time delay network having a relatively short time constant of about 300 milliseconds while any mismatch between the statically compared signals is applied to a second time delay network having a relatively long time constant of about 600 milliseconds. These time delays are of course very short with respect to the aircraft-autopilot control loop natural frequency but long with respect to aircraft vibrations and high frequency noise components inherent in the system or its components.

The dynamic comparison of sensor signals is compensated for maneuver commands from flight path control means such as the localizer radio receiver and compass system on a full time basis. The operation of the command means being the source of the compensating signals which signals in turn are compensated for aircraft movements resulting from such commands, the maneuver command means is itself monitored by the static monitor. As stated, the static and the dynamic monitor comparisons include comparison of signals derived from redundant sources or equivalent signals derived by circuits within the monitor itself.

From another aspect, the static monitor includes a comparison of substantially equivalent signals but rather than carefully adjusting the relative gains of the several signals involved, each of the signals finally to be compared is applied to a limiter and the outputs of the limiters are then compared. This insures that whenever the portion of the autopilot being monitored is responding properly to commands, the maximum input to the static monitor cut-off amplifier and time delay is a function only of the difference in limits and not of the gain of the compared signals. In effect, this comparison insures that the autopilot is responding in the proper direction to the command inputs. Should a malfunction occur resulting in a maneuver in the same direction that a maneuver is required, means responsive to a predetermined magnitude of maneuver command are provided for severing the automatic control of the aircraft. This auxiliary monitor also serves to monitor any command limiter usually incorporated in the autopilot.

Brief description of the drawings

The autopilot monitor of the present invention will be described in connection with the accompanying drawings wherein.

Description of the preferred embodiment

Figure 1A:
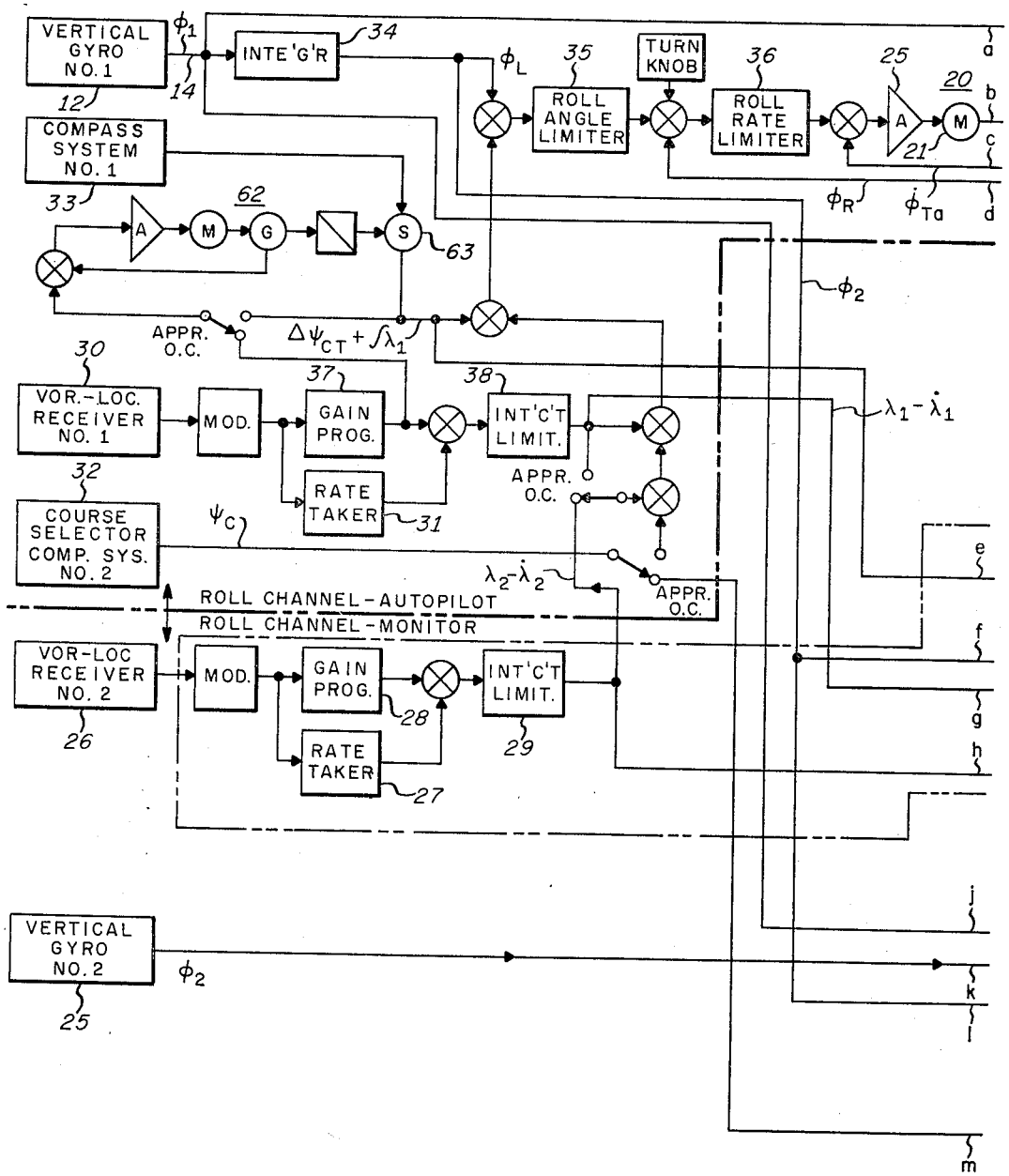
FIGS. 1a and 1b represent in block diagram form a generally conventional aircraft autopilot incorporating the safety monitor of the present invention, the interconnections therebetween being identified by correspondingly lettered leads.
Figure 1B:
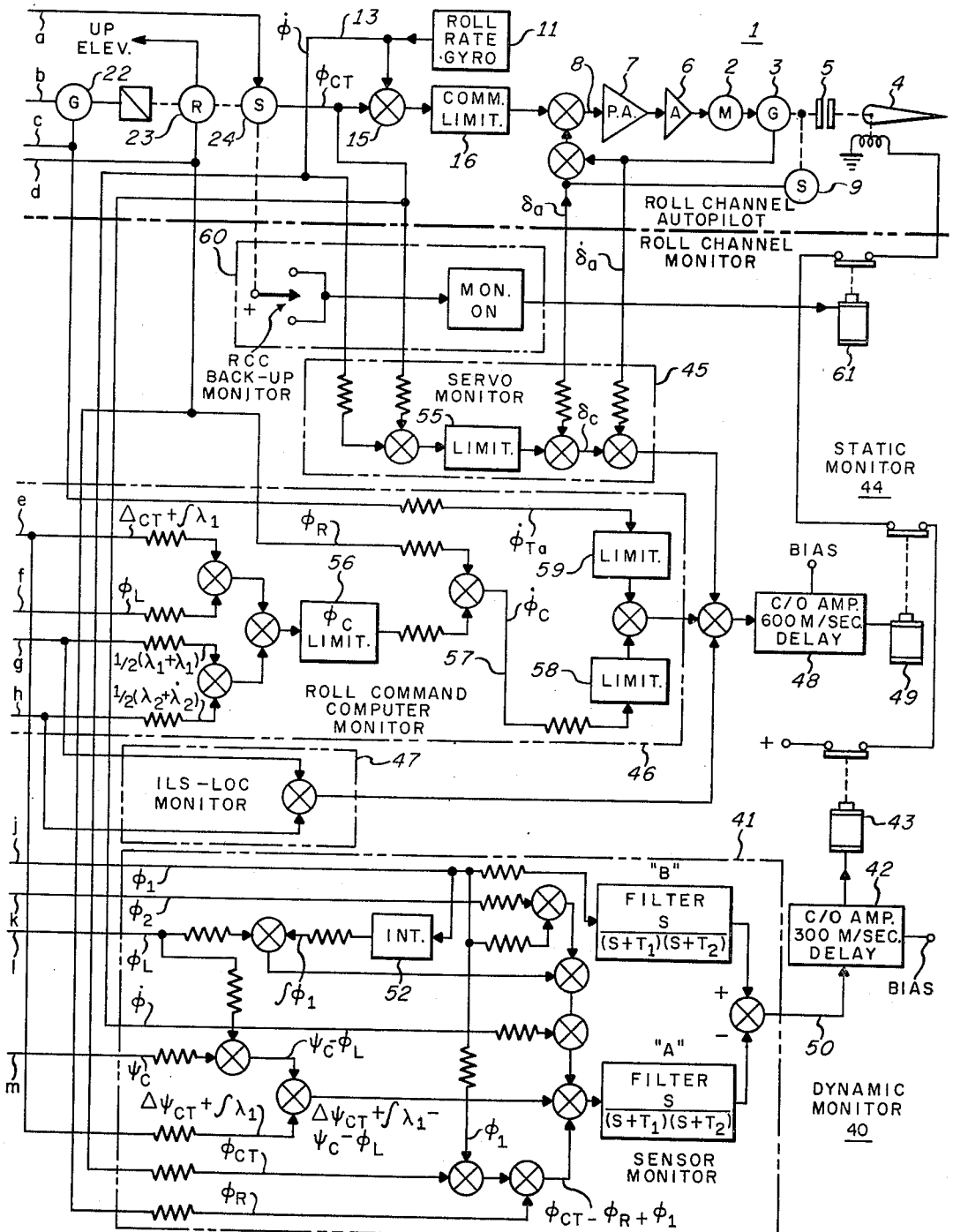

For the purpose of clarity of illustration, the drawing is divided by means of a heavy dot-dash line into upper and lower portions; the upper portion illustrating a generally conventional automatic pilot roll channel of the character disclosed in detail in U.S. Patent 3,007,656 or 3,079,109 both assigned to the same assignee as the present invention. As stated hereinabove, the roll axis monitor is rendered effective during the final approach and flare phase of automatic flight and it will be assumed that all mode switching has been accomplished to establish the various signal interconnections illustrated.

Roll channel of the autopilot comprises generally an aileron servo system 1 comprising a servo motor 2 with rate generator 3 adapted to drive the aircraft ailerons 4 through electrically engaged clutch 5 and suitable gearing. Servo motor 2 is energized from the output of power amplifier 6 and preamplifier 7 in accordance with any servo input signal appearing on lead 8. Surface position transducer 9 and rate generator 3 provide surface displacement and rate feedback signals in a conventional manner. Gyroscopic sensors provide short and long term stabilization for the autopilot, short term stabilization is provided by roll rate gyro 11 and long term or displacement stabilization is provided by vertical gyro 12. The former providing a signal on lead 13 proportional to the rate of roll of the aircraft and the latter providing a signal on lead 14 proportional to the instantaneous roll attitude of the aircraft relative to the horizontal. Roll rate and roll displacement signals are combined at 15 and applied to a command limiter 16 before being applied to the roll servo system, the command limiter serving to limit the deflection of the ailerons 4. The apparatus thus far described serves in a conventional manner to stabilize aircraft about its roll axis in whatever attitude it is commanded.

All input commands to the roll axis of the autopilot are generated by a maneuver command means which in the illustrated embodiment is an electromechanical instrument servo loop generally indicated by reference character 20 and herein referred to as the roll command computer. It comprises servo motor 21 and rate generator 22, synchro resolver 23 and synchro control transformer 24, the latter being connected back-to-back with a synchro transmitter (not shown) on a roll axis of vertical gyro 12. Servo 21 is controlled from the output of servo amplifier 25. Rate generator 22 and synchro resolver 23 provide rate and displacement feedbacks for the roll command computer in a conventional fashion.

Since, as stated, the aircraft is in the final approach mode, bank angle is controlled in accordance with localizer displacement signal from localizer receiver 30, localizer rate as derived from rate taker 31, localizer integral as derived from localizer receiver 30 via compass synchronizer 62, yaw displacement derived from compass system 33, and lagged roll from integrator or lag circuit 34 responsive to the roll attitude signal from vertical gyro 12. All of these signals are summed and applied to the input of roll angle limiter 35 to thereby provide a limited input command to the roll command computer 20. The roll rate of the aircraft in response to the command signal is in turn limited by roll rate limiter 36.

The manner in which the various signals are combined to provide a roll command serving to accurately maintain the aircraft on the localizer beam is described in detail in U.S. Patent 3,007,656, and is very familiar to those skilled in the automatic pilot art. Briefly, the localizer signal is proportional to the displacement of the aircraft from the flight path defined by localizer radio beam displacement and rate are combined to control the rate of craft approach to the beam center. The yaw signal from compass synchronizer 62, which is in an integrate mode, serves to provide improved heading stabilization in the presence of lateral gusts during the approach on-course mode while the lagged roll term from integrator 34 provides a signal proportional to the integral of rate of turn which is therefore generally proportional heading displacement in the frequency range of interest. This latter term serves to compensate for any crab angle due to cross winds which normally reflect in a sustained signal from compass system 33. Gain programmer 37 and intercept angle limiter 38 are conventional and provide course softening and angle of approach limiting respectively.

In operation, the summation of radio, radio rate, radio integral, compass heading and lagged roll signals constitute path command signals which are applied to the roll command computer to rotate the motor 21, generator 22, and synchro control transformer 24 through an angle proportional to the command as determined by the position feedback signal provided by resolver 23, the actual rate of operation of the roll command computer 20 being controlled by means of rate generator 22 and roll rate limiter 36. Rotation of synchro control transformer 24 provides an output which is applied to the aileron servo which in turn will bank the aircraft until the output signal from vertical gyro 12 has cancelled the signal produced by synchro 24. Short period stabilization about the commanded attitude will be stabilized by rate gyro 11.

Inasmuch as the aircraft is in the critical phase of the landing maneuver, very precise and comprehensive monitoring of its operation is mandatory so that should any failure or deterioration of any component within the autopilot roll channel, i.e. in the surface servo, the roll command computer, the gyroscopic sensors or the sources of path control signals, must be immediately detected and acted upon so that the automatic system may be disconnected from the control of the ailerons and allow the human pilot to continue the approach normally through panel knob instruments or to initiate a go-around movement.

The failure monitor of the present invention is illustrated schematically below the heavy dot-dash line in the panel knob instruments or to initiate a go-around movement.

The failure monitor of the present invention is illustrated schematically below the heavy dot-dash line in the drawing. As stated above, the basic operation of the roll channel monitor is one of comparing roll channel commands and lateral axis response signals with similar signals from independent sources or from monitor derived equivalent signals. Any failure of these signals to compare is indicative of a malfunction of the roll channel or roll monitor. For this purpose, vertical gyro 25 provides an independent source of bank angle signal and localizer receiver 26, into rate taker 27, gain programmer 28 and intercept limiter 29 provide independent source of path command signal. Also, course selector 32 is associated with a compass system that is independent of compass system 33 so that the heading terms are provided from independent sources. As will be explained below, equivalent roll channel signals are developed within the roll servo monitor, roll command computer monitor and the sensor monitor. Comparisons of systems commands and responses are implemented in two ways: By dynamic or wash-out comparison or by static or direct signal comparison. With the roll channel operating properly, a null voltage will occur at the outputs of the dynamic and static comparators. However, the roll channel will be automatically disengaged if the output of the dynamic monitor exceeds a predetermined threshold level for a short period of time, 300 milliseconds, or the static monitor exceeds a predetermined threshold for a slightly longer period of time, 600 milliseconds. These very short time delays serve to prevent very high frequency signals, such as noise or other transients from producing nuisance disconnects.

The dynamic monitor 40 is illustrated at the lower portion of the figure and comprises generally sensor monitor 41, cut-off amplifier and time delay 42 and relay 43 connected in the autopilot engage interlock string controlling servo clutch 5. Static monitor 44 comprises generally aileron servo monitor 45, roll command computer monitor 46 and ILS receiver monitor 47 together with cut-off amplifier and time delay 48 and relay 49. Dynamic or wash-out comparison is accomplished with two bandpass filter networks designated "A" and "B." The transfer function of the "A" network passes the high frequency components, i.e. rate components of its input signal while the "B" network passes the next higher order signals, i.e. acceleration components of its input signal. Thus, the dynamic monitor 40 is responsive only to the high frequency components of the compared signals. Static monitor 44 employs no derivative or wash-out circuits and therefore it is sensitive only to generally steady state signal differences of the signals compared therein. Cut-off amplifier and time relay networks 42 and 48 are both similar circuits, each including a bias which determines the threshold level at which it will function and each including time delay means for delaying an output therefrom for 300 and 600 milliseconds respectively. These two networks may be conventional threshold amplifiers with time delay devices incorporated therein but more preferably, they are circuits of the type disclosed in detail in U.S. Patent 3,252,058 assigned to the same assignee as the present invention which provide detection of both in phase and out of phase signal differences at the inputs thereof and are themselves fail safe.

Dynamic monitor 40 is essentially the autopilot sensor monitor and compares the output signals of the autopilot sensors, particularly the gyroscopic references such as vertical gyro 12, rate gyro 11 and compass systems 32 and 33 while roll response compensation is provided by the operation of roll command computer 20 in response to command signals applied thereto. The dynamic monitor operation may best be understood by considering the following equation expressing the output of sensor monitor 41 at lead 50 in terms of the specific comparisons between the inputs applied thereto.

$$e_0 = [(\phi_2 - \phi_1) + (\int \phi_1 - \phi_L) + (\Delta\psi_{CT} + \int \lambda_1 - \psi_C - \phi_L) +$$
$$\text{I} \qquad \text{II} \qquad \text{III}$$
$$(\phi_{CT} - \phi_R + \phi_1)]\text{"A"} - [\dot{\phi}\text{"A"} - \phi_1\text{"B"}]$$
$$\text{IV} \qquad \text{V}$$
$$(1)$$

In this equation only the variables are illustrated, it being understood that each of the variables will have suitable gain constants associated therewith so adjusted as to provide matches during normal autopilot operation, i.e. each comparison is based on gain differences between their respective variables. The symbols employed are defined as follows:

$\phi_1$=Roll attitude, vertical gyro No. 1 (12)
$\phi_2$=Roll attitude, vertical gyro No. 2 (25)
$\phi_L$=Integral of (or lagged) roll attitude, VG. No. 1 (34)
$\int\phi_1$=Integral of (or lagged) roll attitude, monitor derived (52)
$\phi_{CT}$=Commanded roll attitude, control transformer (24)
$\phi_R$=Roll command computer position, synchro resolver (23)
$\dot{\phi}$=Roll rate, rate gyro (11)
$\Delta\psi_{CT}$=Yaw attitude, compass system No. 1 (33)
$\psi_C$=Course error, course selector of compass system No. 2 (32)
$\int\lambda_1$=Integral of radio signal localizer receiver No. 1 (30)

Each one of the comparisons is enclosed by parentheses for ease of understanding and are identified by Roman numerals and in the drawing, these comparisons have been illustrated in a similar manner. However, it will be understood that in actual practice, the various signals may be combined in any convenient order or in a simple parallel summing network.

The primary sensor comparisons are I and V which are the vertical gyro and rate gyro comparisons. Thus, the autopilot gyro 12 and the independent vertical gyro 25 outputs are directly compared and since their signals are normally the same, they will cancel. However, should one gyro fail, there will be a gain difference between the two signals and the dynamic or high frequency component of such difference is derived by the "A" network. Thus, only rate differences will cause an output to appear and the gyro monitor will not be sensitive to steady state differences due to small misalignments. Similarly, in comparison V the output of rate gyro 11 and of vertical gyro 12 are compared but only after the rate gyro signal has been passed through network A and the vertical gyro output has been passed through network B. Network A is a "rate" network and network B is an "acceleration" network, the two signals are normally compatible and will cancel. Hence, as with the V.G. comparisons, only the difference between the high frequency components of the rate gyro and vertical gyro signals is detected. In this manner, malfunctions of the systems gyroscopic sensors are immediately detected and acted upon.

Signal comparisons II, III and IV may be considered roll command and roll response comparisons. The associated signals control the roll command computer to command craft maneuvers in response to path control signals. Comparison II serves to monitor the lag network or integrator 34 from which is derived the cross wind compensation signal discussed above. The comparison is made with the roll attitude signal from vertical gyro 12 which is passed through a similar integral or lag network 52 within the static monitor. The comparison is valid since independent networks 34 and 52 are employed, and comparison I insures the integrity of gyro No. 1 (12) signal.

Comparison III monitors the sensor of compass error and compass synchronizer signals appearing at 63. This signal constitutes another dynamic input to the roll command computer. As previously stated, the compared compass signals are derived from separate compass systems, one being the yaw signal from compass system 33 and the other being the course error signal from an independent compass system associated with course selector 32. The radio integral signal appearing at 63 is compensated by the lagged roll signal; lag roll as stated, being proportional to the integral of turn rate and hence proportion to craft heading displacement in the frequency range of interest. Therefore, in order to render the heading change and radio integral terms compatible during normal operation, lagged roll is combined with course error and any difference between the yaw error plus radio integral and lagged roll plus course error will be a gain difference. As above, the high frequency component of such difference is derived through the "A" network as an input to the cut-off amplifier 42.

Comparison IV is included in the sensor monitor and provides monitoring of synchro resolver 23. This is necessary since the signal from 23 is common to the roll channel and roll monitor command circuits. In effect the difference between the signal output of the roll command computer resolver 23 and the roll command computer signal output of synchro 24 is compared, any difference therebetween being applied to the "A" network. In order that the comparison is compatible for all maneuver commands, the aircraft roll attitude component is effectively removed from the synchro 24 output by subtracting therefrom the actual roll attitude signal from vertical gyro 12. Any difference between the roll resolver 23 signal and the combined synchro 24 and vertical gyro 12 signal is applied to the "A" network thereby ensuring that the roll computer feedback signal is valid.

From the foregoing it will be evident that when all variables are present in the above equation and with the proper selection of gain constant of each of the terms thereof, the output of the dynamic monitor 40 will be zero during all short term craft motions produced by external disturbances or by input commands. Inasmuch as there may be, and generally are, sources of very high frequency signals such as roll command computer jitter, power supply transients, or other "noise," the dynamic monitor includes a time delay having a time constant that is relatively long as compared with such transient high frequency signals and yet is very short with respect to the normal high frequency components of the sensor and/or command signals. The inclusion of the time delay in addition to the bandpass network filter, provides added protection against nuisance disengagements which would occur from a change in bandpass filter characteristics due to deterioration of components, temperature changes and the like.

The static monitoring means 44 of the present invention provides a means for monitoring the generally steady state operation of the aileron servo actuator and a roll command computer as well as the localizer signal source. The operation of both of the servo comparitors are based on generating a servo rate response command, i.e. by summing all of the servo amplifier inputs, and comparing these inputs with the actual rate response of the servo: in essence, the derived servo tachometer response is compared with the actual servo tachometer response on a static basis, that is by direct signal cancellation. Any difference between the compared signals is applied to a time delay network having a considerably longer time constant relative to that of the dynamic monitor time delay. The reason for the increased time constant is because the signals being compared change much more slowly than the sensor signals.

Thus, servo monitor 45 receives the roll rate, roll displacement and surface position feedback signals which are combined to derive a signal proportional to the required rate response of the aileron servo. In order to compensate for the command limiter 16, a similar limiter 55 is included in the circuits for deriving the required response. The simulated tach response signal is compared with the actual servo speed signal produced by the servo tachometer 3 so that in normal operation, the result of the comparison is zero. Should there be a difference greater than the cut-off amplifier bias which exists for longer than 600 milliseconds, a servo malfunction is indicated and relay 49 is actuated to declutch the aileron from the actuator.

The roll command computer monitor is similar functionally to the servo monitor 45 and constitutes the means for monitoring the performance of the roll command computer. This comparison is implemented by deriving in the monitor a command signal corresponding to the command signal applied to the roll command computer 20. This compass error + beam integral term ($\psi_{CT} + \int \lambda_1$), lagged roll ($\phi_1$), and beam displacement and rate ($\lambda + \dot\lambda$) terms, are all combined with their proper gains in the roll command computer monitor 46 and applied to a roll angle limiter 56 within the monitor which corresponds to the limiter 35 in the active channel. To this roll command is applied the roll computer resolver ($\phi_R$) output resulting in a roll rate command ($\dot\phi_C$) signal at lead 57. This derived roll rate command is compared directly with the actual rate response ($\dot\phi_{ta}$) of the roll computer 20 as derived from tachometer 22. In order to prevent nuisance disconnects of the roll channel due to nonlinear response of a tachometer generator 22 as a result of high frequency signal component spectral absorption due to the physical and mechanical characteristics of the roll computer servo motor 21 and also due to any noise sensitivity of the servo amplifier 25, both the servo rate response command ($\dot\phi_C$) and the actual servo rate response ($\dot\phi_{TA}$) are applied to limiters 58 and 59 before being compared. Thus, any difference resulting in an output to static monitor cut-off amplifier and delay network 48 is a function of the difference in the limits imposed by the limiting means rather than a function of the difference in the gain between the signals, the former being much simpler to control than the latter. Consequently, the roll computer monitor 46 senses only that the acual roll computer 20 is responding in he proper direction to its command inputs which is sufficient in combinations with the dynamic monitor to provide the desired cut-off characteristics.

Since the static comparison provided by the static monitor 44 contains no bandpass filters and hence no "wash-out" terms, the comparison is sensitive to either low rate servo ramp overs or servo hardover malfunctions.

It should be pointed out at this point that two sources of ILS displacement and rate terms are employed. In the approach on-course mode, beam displacement and beam rate signals are derived simultaneously from independent receivers, each at one-half gain. The advantage of this equalizing technique comes from the lessened response of the roll computer 20 to a single ILS circuit malfunction. With this equalizing technique, the roll channel and roll monitor use the same ILS circuits and as such monitoring of these circuits is required. This is accomplished in the ILS–LOC monitor 47 where the outputs of the dual ILS circuits are summed in opposing phase into the static monitor cut-off amplifier and delay circuit 48. If a malfunction of the ILS circuit should occur, the differential voltage from output 47 will increase as the aircraft leaves the localizer beam thereby producing servo disengagement.

Since the roll command computer monitor 46 senses only that the roll command computer 20 is responding in the proper direction to roll computer inputs, there is the possibility that a hardover localizer circuit failure may occur in the same direction that beam error corrections require hence satisfying the static monitor. In order to monitor such a malfunction, a roll command computer back-up monitor 60 is provided. This is implemented by a switch (rendered effective by a "monitor on" interlock) actuated by the roll command computer output shaft which will disconnect the roll channel through relay 61 whenever the roll command exceeds a predetermined value, say, 6 degrees. This back-up monitor serves another function during the critical flare mode in that since the limits imposed by the roll angle limiter 35 is approximately 4 degrees operation of the back-up monitor 60 will indicate a failure of the roll angle limiter.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A failure monitor for an automatic pilot for aircraft of the type having a plurality of gyroscopic sensors for detecting motions of said aircraft about one or more of its primary axes and for providing signals in accordance therewith, maneuver command means for supplying a signal controlling the attitude of said aircraft whereby to change its flight path, servo means responsive to said sensor and command signals connected to drive an aircraft control surface and providing output signals in accordance with its operation, and means for disabling said servo means, said failure monitor comprising:

(a) dynamic monitoring means responsive to said gyroscopic sensor signals and including comparison means for comparing selected, normally compatible sensor signals and for supplying an output in accordance with the high frequency components of any mismatch therebetween, (b) static monitoring means responsive to said gyroscopic sensor signals, said maneuver command signals and said servo output signals and including comparison means for comparing relatively steady state components thereof and for supplying an output in accordance with any mismatch therebetween, and, (c) first and second timing means responsive to the outputs of said dynamic and static monitoring means respectively and having their outputs connected to operate said disabling means, said first timing means supplying an output only upon the existence of an output from said dynamic monitoring means for a first predetermined time interval and said second timing means supplying an output only upon the existence of an output from said static monitoring means for a second predetermined time interval greater than said first time interval.

2. The failure monitor as set forth in claim 1 wherein said gyroscopic sensors include attitude sensors responsive to said changes in flight path, wherein said dynamic monitor further includes compensation means responsive to said maneuver command means for maintaining said signals compatible during said maneuvers and wherein said static monitoring means further includes means for monitoring said maneuver command means.

3. The failure mintor as set forth in claim 2 wherein said autopilot includes command signal sources for controlling said maneuver command means and wherein said maneuver command means monitor includes means responsive to said command signal sources for generating an equivalent maneuver command signal, means supplying a signal responsive to the actual operation of said maneuver command means, and means responsive to said signals for providing an output in accordance with any mismatch therebetween.

4. A failure monitor for an automatic pilot for aircraft of the type having a plurality of gyroscopic sensors for detecting motions of said aircraft about one or more of its primary axes and for providing signals in accordance therewith, maneuver command means for supplying a signal controlling the attitude of said aircraft whereby to change its flight path, servo means responsive to said sensor and command signals connected to drive an aircraft control surface and providing output signals in accordance with its operation, and means for disabling said servo means, said failure monitor comprising:

dynamic monitoring means responsive to said gyroscopic sensor signals and including comparison means for comparing selected, normally compatible sensor signals and for supplying an output in accordance with the high frequency components of any mismatch therebetween, static monitoring means responsive to said gyroscopic sensor signals, said maneuver command signals and said servo output signals and including comparison means for comparing relatively steady state components thereof and for supplying an output in accordance with any mismatch therebetween, first and second timing means responsive to the ouputs of said dynamic and static monitoring means respectively and having their outputs connected to operate said disabling means, said first timing means supplying an output only upon the existence of an output from said dynamic monitoring means for a first predetermined time interval and said second timing means supplying an output only upon the existence of an output from said static monitoring means for a second predetermined time interval greater than said first time interval, wherein said gyroscopic sensors include attitude sensors responsive to said changes in flight path, wherein said dynamic monitor further includes compensation means responsive to said maneuver command means for maintaining said signals compatible during said maneuvers and wherein said static monitoring means further includes means for monitoring said maneuver command means, wherein said autopilot includes command signal sources for controlling said maneuver command means and wherein said maneuver command means monitor includes means responsive to said command signal sources for generating an equivalent maneuver command signal, means supplying a signal responsive to the actual operation of said maneuver command means, and means responsive to said signals for providing an output in accordance with any mismatch therebetween, and wherein said maneuver command monitor further includes limting means responsive to each of said last-mentioned signals and wherein said output is a function of the difference in the limits imposed by said limiting means.

References Cited

UNITED STATES PATENTS

| | | |
|---|---|---|
| 2,487,793 | 11/1949 | Esval et al. |
| 2,662,207 | 12/1953 | Hollister. |
| 2,704,647 | 3/1955 | Meyers et al. |
| 2,973,927 | 3/1961 | Miller et al. |
| 2,987,274 | 6/1961 | McWilliams et al. |
| 3,135,485 | 6/1964 | Miller. |

THOMAS E. LYNCH, Primary Examiner

U.S. Cl. X.R.

244—77